US007680408B2

(12) United States Patent
Chang

(10) Patent No.: US 7,680,408 B2
(45) Date of Patent: Mar. 16, 2010

(54) LENS MODULE AND CAMERA MODULE HAVING SAME

(75) Inventor: Jen-Tsorng Chang, Taipei Hsien (TW)

(73) Assignee: Hon Hai Precision Industry Co., Ltd., Tu-Cheng, Taipei Hsien (*) Notice: Subject to any disclaimer, the term of this patent is extended or adjusted under 35 U.S.C. 154(b) by 117 days.

(21) Appl. No.: 11/777,159

(22) Filed: Jul. 12, 2007

(65) Prior Publication Data

US 2008/0138060 A1 Jun. 12, 2008

(30) Foreign Application Priority Data

Dec. 8, 2006 (CN) ........................ 2006 1 0157360

(51) Int. Cl.
*G03B 3/10* (2006.01)
*G03B 13/34* (2006.01)
*G03B 17/00* (2006.01)

(52) U.S. Cl. ....................................... 396/133; 396/532

(58) Field of Classification Search ................. 396/529, 396/532, 133; 359/793
See application file for complete search history.

(56) References Cited

U.S. PATENT DOCUMENTS 6,898,030 B1* 5/2005 Lin et al. .................... 359/819
2005/0024518 A1* 2/2005 Chang et al. ................ 348/335
2006/0140623 A1* 6/2006 Yu ............................. 396/529
2007/0052920 A1 3/2007 Stewart et al.
2007/0122132 A1* 5/2007 Misawa et al. ................ 396/55

FOREIGN PATENT DOCUMENTS

CN 1740836 A 3/2006
CN 1967314 A 5/2007
WO WO2006/087408 A1 8/2006

* cited by examiner

*Primary Examiner*—W. B. Perkey
*Assistant Examiner*—Noam Reisner
(74) *Attorney, Agent, or Firm*—Clifford O. Chi

(57) ABSTRACT

A lens module includes a lens barrel, a first lens, a second lens, a plurality of electrostrictive members and a controlling unit. The first lens has a first optical axis thereof, the second lens has a second optical axis thereof, the first and second lenses being received in the lens barrel. The electrostrictive members are arranged in the lens barrel and connected with the second lens. The controlling unit is configured for controlling the electrostrictive members so as to adjust the second optical axis of the second lens to be in alignment with the first optical axis of the first lens. A camera module using the lens module is also provided.

20 Claims, 4 Drawing Sheets

LENS MODULE AND CAMERA MODULE HAVING SAME

BACKGROUND

1. Technical Field

The present invention relates to lens modules, and particularly to a lens module having lenses with aligned principal optical axes, and a camera module having the lens module.

2. Description of Related Art

With the ongoing development of microcircuitry and multimedia technology, camera modules, including, e.g., still camera modules and digital camera modules have entered widespread use and have combined with various electronic devices. Such camera modules need to be compact, low cost and have excellent optical performance.

Lens modules are key components of the camera modules. A lens module typically includes a lens barrel, and lenses received in the lens barrel. The lenses each usually define an optical axis along a geometric central axis thereof, the optical axes of the lenses are required to be positioned in alignment with each other and as well as a geometric central axis of the lens barrel. However, when an optical axis of a lens deviates from a geometric central axis of the lens, it results in difficulty in positioning the optical axis of this lens in alignment with those of other lenses and the geometric central axis of the lens barrel, this lens therefore has to be compensated for by other lenses, or to be rejected.

What is needed, therefore, is a lens module which is capable of adjusting an optical axis of a lens thereof to be in alignment with those of other lenses.

What is also needed is a camera module using the lens module.

SUMMARY

In a preferred embodiment, an exemplary lens module includes a lens barrel, a first lens, a second lens, a plurality of electrostrictive members and a controlling unit. The first lens has a first optical axis thereof, the second lens has a second optical axis thereof, the first and second lenses being received in the lens barrel. The electrostrictive members are arranged in the lens barrel and connected with the second lens. The controlling unit is configured for controlling the electrostrictive members so as to adjust the second optical axis of the second lens to be in alignment with the first optical axis of the first lens.

In another preferred embodiment, an exemplary camera module includes a lens barrel, a first lens, a second lens, a plurality of electrostrictive members, a controlling unit and an image sensor. The first lens has a first optical axis thereof, the second lens has a second optical axis thereof, the first and second lenses being received in the lens barrel. The electrostrictive members are arranged in the lens barrel and connected with the second lens. The controlling unit is configured for controlling the electrostrictive members so as to adjust the second optical axis of the second lens to be in alignment with the first optical axis of the first lens. The image sensor is located in alignment with the first optical axis of the first lens.

Other advantages and novel features of the present invention will become more apparent from the following detailed description of preferred embodiment when taken in conjunction with the accompanying drawings.

BRIEF DESCRIPTION OF THE DRAWINGS

Many aspects of the lens module and camera module can be better understood with reference to the following drawings. The components in the drawing are not necessarily drawn to scale, the emphasis instead being placed upon clearly illustrating the principles of the present lens module and camera module. Moreover, in the drawings, like reference numerals designate corresponding parts throughout the several views.

DETAILED DESCRIPTION OF THE PREFERRED EMBODIMENTS

Embodiments of the present lens module and camera module will now be described in detail below and with reference to the drawings.

Figure 1:
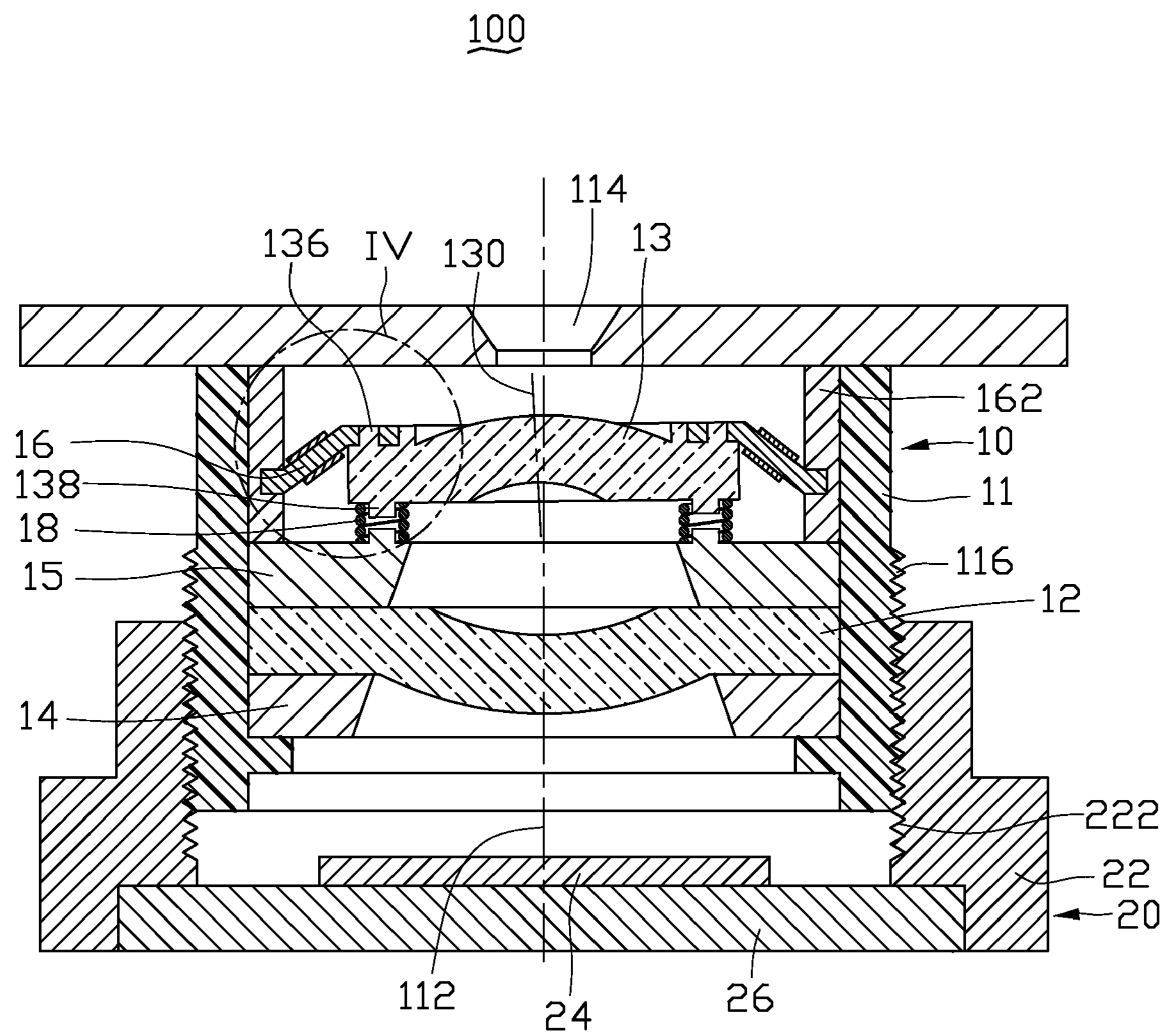
FIG. 1 is a schematic view of a camera module according to a preferred embodiment of the present invention.

Referring to FIG. 1, an exemplary camera module 100 according to a preferred embodiment includes a lens module 10, and an image sensor module 20 for detecting light from the lens module 10.

The lens module 10 includes a lens barrel 11, a first lens 12, a second lens 13, two spacers 14, 15, an electrostrictive device 16 and a plurality of spring members 18 cooperating with the electrostrictive device 16. The lens barrel 11 is cylindrical, and has a geometric central axis 112. The lens barrel 11 has a light incident opening 114 at an end thereof, and has outer threads 116 on an outer wall thereof. The first lens 12 is secured in the lens barrel 11 by the two spacers 14, 15. An optical axis of the first lens 12 coincides with a geometric central axis of the first lens 12, and is in alignment with the geometric central axis 112 of the lens barrel 11. An external diameter of the first lens 12 is matched with an inner diameter of the lens barrel 11. The second lens 13 is secured in the lens barrel 11 by the electrostrictive device 16 and the spring members 18.

Figure 2:
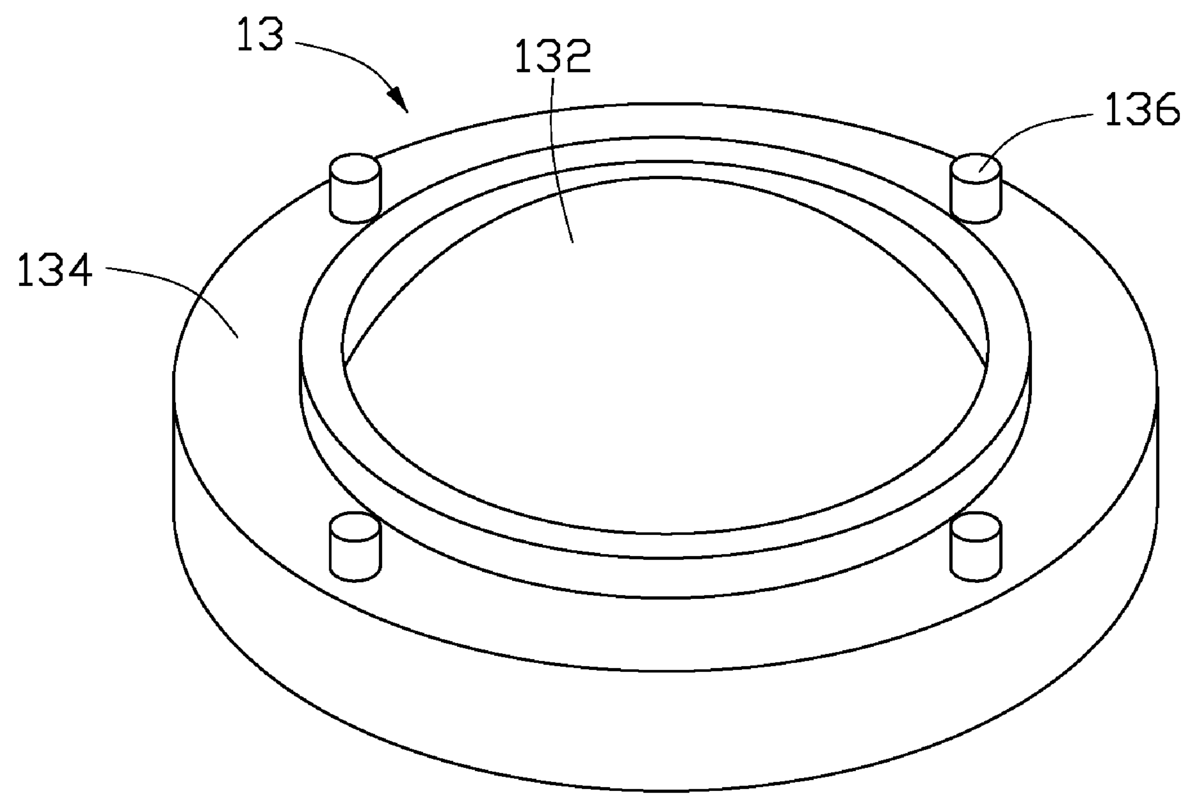
FIG. 2 is a schematic view of the second lens shown in FIG. 1.
Figure 3:
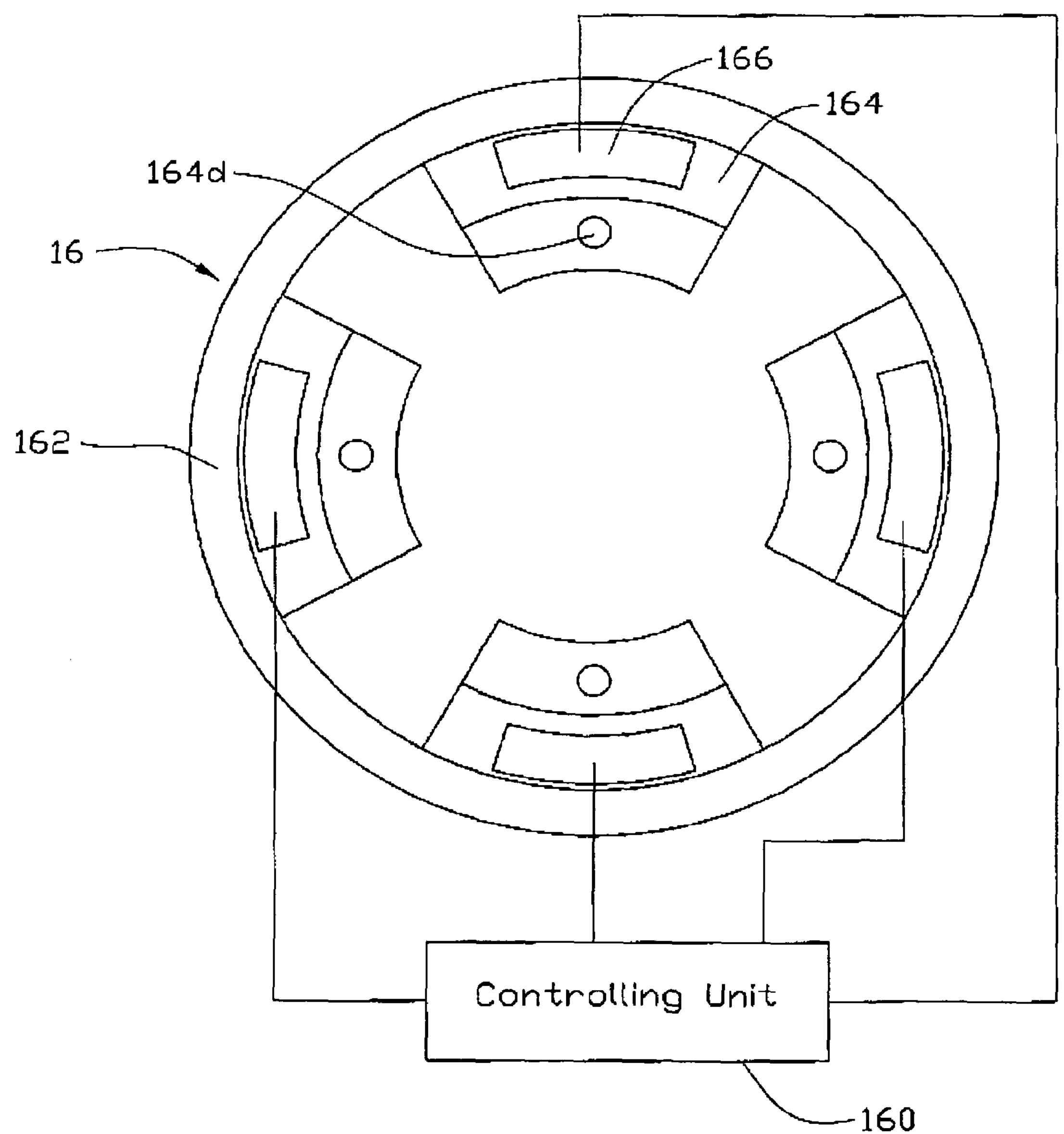
FIG. 3 is a schematic view of the electrostrictive device shown in FIG. 1.
Figure 4:
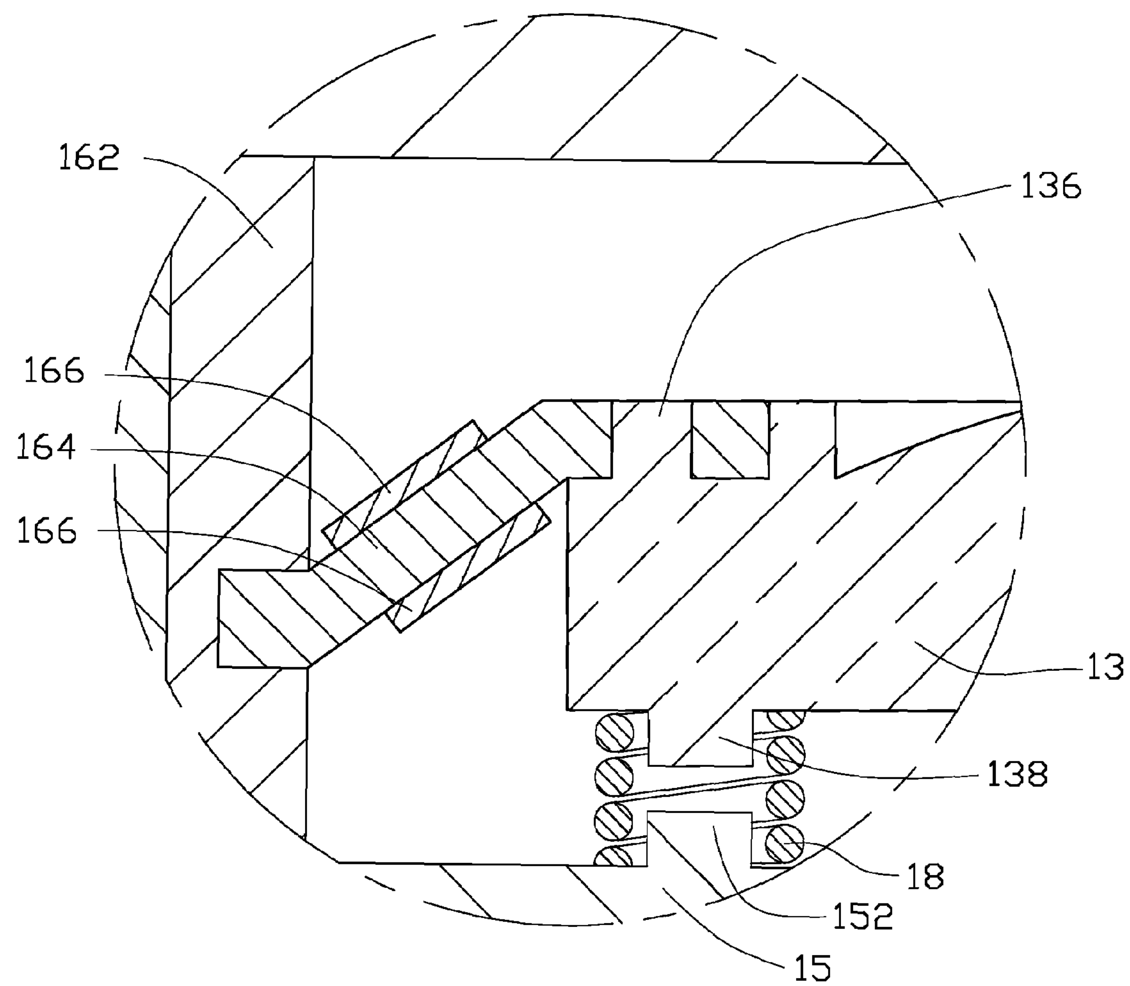
FIG. 4 is an enlarged view of IV shown in FIG. 1.

Also referring to FIGS. 2 to 4, the second lens 13 includes central active portion 132 and a peripheral inactive portion 134 surrounding the central active portion 132. The peripheral inactive portion 134 has four anchoring posts 136 at a top surface thereof, and a plurality of protrusions 138 at an opposite bottom surface thereof. A geometric central axis of the second lens 13 is aligned with the geometric central axis 112 of the lens barrel 11, and an optical axis 130 of the second lens 13 is defined slantways to the geometric central axis thereof.

The electrostrictive device 16 includes a ring-shaped peripheral portion 162 attached to an inner wall of the lens barrel 11, four electrostrictive members 164 extending from an inner wall of the peripheral portion 162, and a controlling unit 160. The electrostrictive member 164 can be made from an electroactive polymer or a conductive polymer. The four electrostrictive members 164 each define a through hole **164*d* therein for engagably receiving the respective four anchoring posts 136 of the second lens 13 therein. An angle between an electrostrictive direction of each of the four electrostrictive members 164 and the optical axis 130 of the second lens 13 can be an acute angle or an obtuse angle. The controlling unit 160 includes a plurality of electrodes 166, each electrodes 166 is positioned opposite another electrode 166 on surfaces of each of the four electrostrictive members 164 and configured (i.e., structured and arranged) for controlling each of the four electrostrictive members 164**.

The spacer 15 has a plurality of protrusions 152 thereon. The spring members 18 are sandwiched between the protrusions 152 of the spacer 15 and the protrusions 138 of the second lens 13 thereby cooperatively supporting the second lens 13. A resilience direction (i.e., direction of resilient compression) of each of the respective spring members 18 is defined parallel to the geometric central axis 112 of the lens barrel 11.

The image sensor module 20 includes a holder 22, an image sensor 24 and a circuit board 26. The holder 22 has inner threads 222 at an inner wall thereof, thus facilitating engagement with the outer threads 116 of the lens barrel 11. The image sensor 24 is selected from a charge coupled device (CCD for short) or a complementary metal oxide semiconductor transistor (CMOS for short), and is mounted on the circuit board 26. A geometric central axis of the image sensor 24 is aligned with the geometric central axis 112 of the lens barrel 11.

When a voltage power is applied to the electrodes 166, the four electrostrictive members 164 will be electrostrictive, i.e., be lengthened or contracted according to increases or decreases in the voltage power applied to the electrodes 166, thus applying a force on the second lens 13 and facilitating movement of the second lens 13. The optical axis 130 of the second lens 13 can thus be adjusted to be in alignment with that of the first lens 12, and as well as the geometric central axis 112 of the lens barrel 11.

The four spring members 18 each are able to be lengthened or contracted according to the electrostriction of the respective four electrostrictive members 164, thus helping movement of the second lens 13.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A lens module, comprising:

a first lens having a first optical axis;

a lens barrel;

a second lens having a second optical axis, the second lens being received in the lens barrel;

a plurality of electrostrictive members arranged in the lens barrel and connected with the second lens, wherein in a nonoperating state of the lens module, an angle between an electrostrictive direction of each of the electrostrictive members and the second optical axis of the second lens is an acute angle or an obtuse angle; and a controlling unit for controlling the electrostrictive members so as to adjust the second optical axis of the second lens to be in alignment with the first optical axis of the first lens.

2. The lens module as described in claim 1, wherein the lens barrel has a geometric central axis, the geometric central axis of the lens barrel being in alignment with the first optical axis of the first lens.

3. The lens module as described in claim 1, wherein the second lens has a central active portion and a peripheral inactive portion surrounding the central active portion, the peripheral inactive portion having a plurality of anchoring posts thereon, the electrostrictive members each defining a through hole engagably receiving a respective one of the anchoring posts therein.

4. The lens module as described in claim 1, wherein a material of each of the electrostrictive members is selected from a group consisting of an electroactive polymer and a conductive polymer.

5. The lens module as described in claim 1, wherein the controlling unit comprises a plurality of electrodes, each electrode being positioned opposite another electrode on surfaces of each of the electrostrictive members.

6. The lens module as described in claim 1, further comprising a spacer and a plurality of spring members attached on the spacer, the spring members cooperatively supporting the second lens.

7. The lens module as described in claim 5, wherein the spacer has a plurality of first protrusions thereon, the second lens has a plurality of second protrusions thereon, the second protrusions of the second lens facing toward the first protrusions of the spacer, the spring members being sandwiched between the first protrusions of the spacer and the second protrusions of the second lens.

8. A lens module, comprising:

a first lens having a first optical axis;

a lens barrel;

a second lens having a second optical axis, the second lens being received in the lens barrel;

a plurality of electrostrictive members arranged in the lens barrel and connected with the second lens; and a controlling unit for controlling the electrostrictive members so as to adjust the second optical axis of the second lens to be in alignment with the first optical axis of the first lens;

wherein the second lens has a central active portion and a peripheral inactive portion surrounding the central active portion, the peripheral inactive portion having a plurality of anchoring posts thereon, the electrostrictive members each defining a through hole engagably receiving a respective one of the anchoring posts therein.

9. The lens module as described in claim 8, wherein the lens barrel has a geometric central axis, the geometric central axis of the lens barrel being in alignment with the first optical axis of the first lens.

10. The lens module as described in claim 8, wherein an angle between an electrostrictive direction of each of the electrostrictive members and the second optical axis of the second lens is an acute angle or an obtuse angle.

11. The lens module as described in claim 8, wherein a material of each of the electrostrictive members is selected from a group consisting of an electroactive polymer and a conductive polymer.

12. The lens module as described in claim 8, wherein the controlling unit comprises a plurality of electrodes, each electrode being positioned opposite another electrode on surfaces of each of the electrostrictive members.

13. The lens module as described in claim 8, further comprising a spacer and a plurality of spring members attached on the spacer, the spring members cooperatively supporting the second lens.

14. The lens module as described in claim 13, wherein the spacer has a plurality of first protrusions thereon, the second lens has a plurality of second protrusions thereon, the second protrusions of the second lens facing toward the first protrusions of the spacer, the spring members being sandwiched between the first protrusions of the spacer and the second protrusions of the second lens.

15. A lens module, comprising:

a first lens having a first optical axis;

a lens barrel;

a spacer;

a second lens having a second optical axis, the second lens being received in the lens barrel;

a plurality of spring members attached on the spacer, the spring members cooperatively supporting the second lens;

a plurality of electrostrictive members arranged in the lens barrel and connected with the second lens; and a controlling unit for controlling the electrostrictive members so as to adjust the second optical axis of the second lens to be in alignment with the first optical axis of the first lens;

wherein the spacer has a plurality of first protrusions thereon, the second lens has a plurality of second protrusions thereon, the second protrusions of the second lens facing toward the first protrusions of the spacer, the spring members being sandwiched between the first protrusions of the spacer and the second protrusions of the second lens.

16. The lens module as described in claim 15, wherein the lens barrel has a geometric central axis, the geometric central axis of the lens barrel being in alignment with the first optical axis of the first lens.

17. The lens module as described in claim 15, wherein the second lens has a central active portion and a peripheral inactive portion surrounding the central active portion, the peripheral inactive portion having a plurality of anchoring posts thereon, the electrostrictive members each defining a through hole engagably receiving a respective one of the anchoring posts therein.

18. The lens module as described in claim 15, wherein an angle between an electrostrictive direction of each of the electrostrictive members and the second optical axis of the second lens is an acute angle or an obtuse angle.

19. The lens module as described in claim 15, wherein a material of each of the electrostrictive members is selected from a group consisting of an electroactive polymer and a conductive polymer.

20. The lens module as described in claim 15, wherein the controlling unit comprises a plurality of electrodes, each electrode being positioned opposite another electrode on surfaces of each of the electrostrictive members.

* * * * *